Patented May 8, 1934

1,958,232

UNITED STATES PATENT OFFICE 1,958,232

PRESERVATION OF CITRUS FRUIT JUICES AND PRESERVED PRODUCT

Francis Burkart, Eustis, Fla.

No Drawing. Application June 23, 1931, Serial No. 546,429

6 Claims. (Cl. 99—11)

The subject of this invention is the preservation of citrus fruit juices, as well as the preserved product itself. It devolves about the conditioning of the raw juice of citrus fruit, more particularly from the aspect of permitting such juice to be put up for transit, storage, and sale in cans, bottles, or other hermetically sealed packages, without danger of the juice becoming spoiled on account of spontaneous decomposition, mould, fermentation, or the like, for a long period of time.

It is a desideratum of the first magnitude in the citrus-fruit-producing industry, like orange growing, that the excess fruit available during the harvesting season be squeezed or extracted of its juice near the groves, and the valuable juice kept substantially unimpaired for supply to the consumer, especially during the off-season, in a suitable package or container. This could not heretofore be done satisfactorily, because of the tendency for the juice to spoil quickly through mould, fermentation, oxidation, and other changes, not only when exposed to the atmosphere but also when bottled, canned, or otherwise confined from atmospheric influences. The fermentation and other changes occurring in the confined juice are attributable to the yeast, bacteria, and spores which are inevitably associated with the raw juice as extracted from the fruit, and which continue to flourish therein unless inhibited by some special treatment. While it is possible to sterilize the juice by heating, the temperature to which the juice must be heated for this purpose is in the vicinity of 170° to 185° F., or even higher and at these temperatures the delicate flavor and bouquet of the juice is badly injured and the juice acquires a cooked or foreign flavor unpalatable to the discriminating person. The particular elevated temperature within the range hereinbefore cited has to be coordinated with a suitable time of treatment at such temperature, it being necessary to heat the juice for a longer period of time at 170° F. than at 185° F. to impart comparable keeping qualities to the juice. Thus, to attain worthwhile keeping properties in the juice, the heating period at 170° F. may be from 45 minutes to 1 hour, whereas at 185° F. it may be 20 minutes or so. In any event, however, the product acquires an undesirable cooked flavor. So, too, the essential oils in the juice give it a disagreeable taste, especially after long-standing, and are troublesome when the juice is packed in metal cans, since they and/or their decomposition products apparently tend to corrode the cans and thus to render the juice unfit for drinking. I have discovered that it is possible to sterilize the juice at temperatures not exceeding 150° F., with remarkable success for all practical purposes, if the juice undergoes sterilization in the presence of added alkali. While it is possible to use various alkalies, I have found it preferable to use alkaline earth metal oxides, notably lime, for not only does the lime promote the desired sterilization, but it is relatively inexpensive and can be used in such small amount as to have practically no ill effect on the juice, in so far as concerns injuring its flavor or aroma, altering its composition, or causing objectionable turbidity or settling tendencies therein. In fact, the lime, which is preferably used in the purest form available, can be added to the juice as a lime solution or so-called lime water, in which the lime may be present substantially up to the saturation point of the solution. The lime water, preferably free from undissolved lime, may be added to the juice immediately before or during its heat-sterilization, which, as already indicated, can be accomplished at 150° C. without injury to the natural juice characteristics. Only an exceedingly short heating treatment of the juice is necessary, a few minutes' treatment, or even a shorter treatment, sufficing to ensure a condition in the juice equivalent to or excelling the condition of sterility heretofore achieved only after heating the juice at 185° F. for as long a period as ½ hour. That citrus fruit juice processed in accordance with my invention has been rid of deleterious micro-organisms is borne out by the fact that when put up in closed containers and kept for months, it undergoes little, if any, change in color, taste, etc., and shows no signs of having undergone fermentation or other undesirable chemical change. Aside from the keeping qualites of the processed juice, during the processing itself, the juice retains its natural color and its vitamin content, as the temperature applied and the duration of heating are short of being harmful in these respects, as well as those others already mentioned. A batch of processed juice is preferably packaged in closed containers while the juice is still in hot condition. Since the juice has been processed in bulk, the closed container for packing the juice may be as large as, say, a tank-car or as small as, say, an eight-ounce bottle or can. For instance, it may be delivered while hot, say, 150° C., to canning machines, which fill metal cans with the hot juice and then seal the cans. The sealed cans are then preferably immediately chilled, as by plunging in a cold water bath, to room temperature or thereabout, so as to inhibit such tendency as might exist at elevated temperature for the juice to react with the metal of the cans. It is for this latter reason, too, that I prefer to sterilize the juice as a batch prior to canning, although I would not regard it as a departure from the principles of my invention if the lime-treated juice were first put up in cans or in other closed containers and heat-sterilized under confinement at temperatures below those destructive to the natural juice qualities. It is also of advantage to package the already-sterilized juice, for the reason that the can or other container may be completely filled with the juice, so as to exclude any air, whose contact with the juice is, of course, to be avoided, if possible, in order to prevent any deterioration due to oxidation. In fact, the chilling of the hot juice in the sealed cans tends to produce a vacuum therein, owing to the contraction of the juice and the condensation of such vapors as are present therein after the sealing operation. This could not be done if sterilization or heating were to be accomplished on the juice in sealed cans or other closed containers, as in such case an air space must be left in the container in order to permit heat expansion of the juice to take place without breaking the seal or the container itself. In this connection, it is perhaps well again to observe that it is the conjunctive action of the heat and the alkali that is responsible for the surprising keeping qualities of the processed juice. Thus, whereas a juice which has been heated at 150° F. in the presence of alkali for only a few minutes, in accordance with my process, stands up without deterioration for months in cans or other closed containers, a juice which has been similarly heated but in the absence of alkali ferments so badly as to blow up the can or bottle in which it is confined. My juice product can even be sweetened with sugar or syrup at any suitable stage in its processing, preferably before or during sterilization, without being rendered susceptible to fermentation.

I am unaware of the exact nature of the chemical and/or bacteriological reactions which ensue in a juice processed in accordance with my invention, but it is probable that the alkali eventually appears in the juice as the citrate. In the case of lime, which, as already indicated, is the alkali preferably employed, it is quite unlikely that the lime reacts at once with the organic acid in the juice. My theory is that the lime, when initially added to the juice, exists largely as such for a substantial period of time, and furnishes sufficient free hydroxyl ion to upset the environment or conditions to which the micro-organisms, including the yeasts and bacteria in the juice, have been accustomed, and so, in conjunction with the heat factor, renders them innocuous. Whether or not this picture is correct, it is a fact that my invention makes possible in a practical and comparatively inexpensive way, a long-time preservation of citrus fruit juice in substantially the same condition of flavor, color, aroma, composition, etc., as when squeezed from the fruit. It might be remarked, at this point, that my discovery was an empirical one. Nor are the results which I secure ones which could be reasoned out a priori. On the contrary, one might forecast that the more nearly neutral was the juice, the better a medium it would be for the propagation of micro-organisms therein. So, too, one might predict that a small quantity of alkali, such as I use, would play little, if any, role other than that of neutralizing some acid in the juice. The neutralizing reaction, in the case of lime, for instance, is, however, quite incidental, although it is perhaps a happy incident to have the lime appear eventually in the juice as a salt, such as calcium citrate, rather than as free lime or lime water, because the juice has no observable limey taste. The lime is probably valuable because it furnishes the sterilizing hydroxyl radical which exists as such for a long while before it is consumed by reaction with the slow-reacting organic acid in the juice. Moreover, the lime, especially when added as lime water containing no undissolved lime, furnishes the hydroxyl ion in such low concentration as not to discolor the juice or otherwise injure it. Nor is it necessary to weaken or dilute the juice sensibly with the lime water to secure the desired results, a relatively very small amount being all that is necessary in my sterilizing process.

While not limited thereto, I shall now describe my process as applied to a typical orange juice, for instance, the juice of so-called Valencia oranges, grown in Florida. The raw juice may be squeezed or extracted from the oranges in any well-known manner. For instance, after the oranges have been washed, they may be sliced in halves and their insides ground out along with the juice, as by pressing them against the rotating burred heads of orange squeezers of the same type used at soda fountains. The operator should exercise care not to press the orange halves too hard against the grinding heads, since it is desirable that as little as possible of the orange oil be squeezed out of the peel or husk into the juice. The juice, pulp, and the seeds are delivered to a metal-cloth strainer of suitably fine mesh to catch or retain the seeds and so-called rags and to permit the passage of the valuable juice and fine meats. The strained juice is passed to a jacketed mixing tank, preferably lined with corrosion-resistant material, such as glass or enamel. Hot water is passed through the jacket to heat the juice up to not exceeding 150° F.; and while the juice is being heated and is under agitation, a small stream of lime water is run into the agitated juice. The lime water is preferably only about 85% saturated, and is added in such small amount as to effect only about a 2% dilution of the juice. That is to say, the addition of the lime water is controlled so that only about 2 quarts are added for every 25 gallons of juice in the batch. Such orange or essential oil as happens to be in the batch rises to the top and should be removed as by skimming or decanting, since it tends to decompose, even in a closed container, after a while, and to impart a disagreeable taste to the juice. The hot juice can be permitted to flow directly from the tank to a can-filling machine; and the cans, filled to the very top with hot juice, can be sealed and immediately plunged into a bath of cold water. In fact, the processed juice is preferably canned and cooled so quickly in the cans that it does not drop materially below 150° F. from the time it leaves the tank to the time the sealed cans are plunged into the cold water. In actual practice, the hot juice need not remain in the cans for more than 30 seconds before it is cooled. The time consumed in heating the juice in the tank and in passing it to the canning machine may be only a matter of a few minutes.

In making up the lime water, water at seasonable temperature may be employed together with a pure form of lime, such as that intended for human consumption. Despite the lower solubility of calcium oxide at elevated temperature, there is no tendency for precipitation to occur at 150° F. in the juice, especially when the lime water is sub-saturated, because the lime water is greatly diluted by the water content of the juice. This dilution occurs practically instantaneously when the lime water is added slowly to an agitated body of the orange juice as described. Moreover, the immediate dissemination of the lime water throughout the body of the orange juice ensures a uniform reaction and a uniform product. The calcium citrate, into which it is believed the lime is largely transformed in time, is about as soluble as the lime, so that no subsiding tendencies exist in the processed juice, even when it is chilled in an ice-box or refrigerator prior to being consumed. The lime water may be added as a saturated solution, in which case it would be prepared by adding excess lime to water, mixing thoroughly, permitting the excess to settle, and then decanting the clear, supernatant lime water. It is not desirable, so far as I have determined, to use a super-saturated solution, i. e., one containing undissolved lime in suspension, as it might tend to remain as such in the juice. Just to demonstrate the insignificant change in composition which a juice must undergo in my process, even under extreme conditions, that is, assuming the use of a saturated solution of lime and that the lime reacts in entirety with the citric acid in the juice, I might call attention to the fact that at 0° C., the temperature at which calcium oxide is most soluble in water, 100 parts of a saturated solution contain only 0.131 parts of lime. This corresponds to a solution of 0.131%, which is diluted to approximately 0.0013% when added to the orange juice in the proportion hereinbefore cited. Under conditions of complete reaction with the citric acid of the juice to form calcium citrate, the juice would undergo a reduction of acidity amounting to only:

$$\frac{x}{.0013} = \frac{192 \text{ (citric acid)}}{56 \text{ (lime)}} = .00445\%$$

It is thus seen that the juice can properly be described as possessing substantially its original composition. In point of fact, the amount of lime added is so insignificant as to defy detection by analysis, especially since it probably eventually appears in the juice chemically combined as calcium citrate,—a constituent of orange juice anyhow. One of the advantages which my processed juice possesses over even the raw juice, is that when a can or other container in which it has been confined is opened to the atmosphere, it can stand longer than the natural juice without spoiling. Thus, whereas a raw juice exposed to room temperature ferments and becomes mouldy in less than twenty-four hours, my processed juice will keep forty-eight hours under the same conditions, and will stand up much longer when refrigerated.

The example of procedure hereinbefore given is subject to considerable variation while still falling within the purview of the present invention. For instance, it is possible to vary the amount of lime or lime water added to the juice, depending upon its composition, but, as already observed, a sub-saturated solution of lime in such small amount as to effect practically no dilution of the juice and to impart no observable limeyness thereto is all that is necessary to accomplish the desired results. So, too, it is possible to heat the juice to less than 150° F., although to be on the safe side I prefer to use this degree of temperature, since it is not detrimental to the natural flavor.

So far as I have been able to determine, the hydroxyl ion furnished by the lime water coupled with the heat underlie the sterilized condition which the juice assumes. In order to avoid neutralization of the lime before it has exerted its sterilizing effect, the lime water is preferably added to the heated juice so as to realize the sterilizing activity of the hydroxyl ion immediately in the presence of heat. It is, however, possible to add the lime water to the raw juice immediately before the mixture is heated to 150° F. Apart from the desirability of securing a uniform reaction and product, a gradual addition of the lime water to the agitated juice avoids a temporary local over-concentration of hydroxyl ion in the juice, or localized precipitation of lime. It is possible to use magnesium oxide in place of part or all of the calcium oxide, but the magnesium oxide has the disadvantage of not being as soluble as the calcium oxide, even though its citrate is of the same order of solubility as calcium citrate. Lime is also to be preferred over such alkalies as caustic soda, in that it is a weaker alkali and has no sensible effect on the natural properties of the juice, and generates calcium citrate, which is invariably a constituent of the natural juice. When it is desired to enhance the sweetness of the juice, this is preferably done by dissolving, say, 2%, more or less, of cane sugar or its equivalent, based on the weight of raw juice, in the juice itself or in the lime water to be added to the juice.

The process of the present invention is applicable to citrus fruit juices other than oragne juice, e. g., the juice of tangerines, grape fruit, lemons, and the like. In the case of any juice, however, the temperature of heating to effect sterilization is below that at which the juice loses its natural properties, since the lime employed as the auxiliary sterilizing agents can be applied in such amount as to ensure excellent keeping qualities without appreciably altering the composition of the juice or its other natural characteristics. In the case of juices other than orange, one need not, however, adhere to the maximum temperature of heating (150° F.) permissible in the case of orange juice, it being well known that juices of different kinds can withstand different maximum temperatures of heating without being injured.

In so far as subject matter is concerned, this application is a continuation in part of my application Ser. No. 299,642, filed August 14, 1928.

I claim:

1. As an article of manufacture, a citrus fruit juice having substantially the concentration and other characteristics, including acidity, of the raw juice but being capable of being kept for a long period of time without spoilage in a closed container, said juice containing substantially all of the elements of the raw juice but having a mineral content only a small fraction of a per cent. greater than that of the raw juice.

2. As an article of manufacture, orange juice having substantially the concentration and other characteristics, including acidity, of the raw juice but having keeping qualities in a closed container, said juice containing substantially all of the elements of the raw juice but having a calcium content only a small fraction of a per cent. greater than that of the raw juice.

3. In a process of preserving orange juice, that step which comprises maintaining it in the presence of a slight amount of added, completely dissolved alkali at a temperature not exceeding 150° C. for not more than a few minutes, said amount of alkali having substantially no observable effect on the acidity of the juice but promoting its substantially complete sterilization.

4. A process of preserving orange juice, which comprises maintaining it in the presence of a slight amount of added, completely dissolved alkali at a temperature not exceeding 150° F. for not more than a few minutes, said amount of alkali having substantially no observable effect on the acidity of the juice but promotes its substantially complete sterilization, removing the oil coming to the top of the juice while it is thus heated, and confining the hot juice in air-tight containers.

5. In a process of preserving citrus fruit juice, those steps which comprise heating the juice to a temperature not exceeding 150° F., mixing into the juice while thus heated a comparatively small amount of subsaturated lime water having substantially no observable effect on the acidity of the juice but promoting its substantially complete sterilization, and quickly cooling the juice after it has remained heated for not more than a few minutes.

6. In a process of preserving orange juice, that step which comprises maintaining the juice in the presence of a slight amount of added, completely dissolved lime at a temperature not exceeding 150° F. for not more than a few minutes, said amount of lime having substantially no observable effect on the acidity of the juice but promoting its substantially complete sterilization.

FRANCIS BURKART.